United States Patent [19]
Yoshida et al.

[11] Patent Number: 5,486,965
[45] Date of Patent: Jan. 23, 1996

[54] ROTARY INFORMATION RECORDING/REPRODUCING APPARATUS CARRIAGE ACTUATOR ARRANGEMENT

[75] Inventors: Takeshi Yoshida; Hideaki Amano, both of Odawara; Takashi Kohno, Ibaraki; Kenji Mori, Hadano; Takashi Yoshida, Ibaraki; Hiromu Hirai, Tsukuba, all of Japan

[73] Assignee: Hitachi, Ltd., Tokyo, Japan

[21] Appl. No.: 198,593

[22] Filed: Feb. 18, 1994

[30] Foreign Application Priority Data

Feb. 18, 1993 [JP] Japan ............................. 5-029230

[51] Int. Cl.⁶ ...................................... G11B 5/55
[52] U.S. Cl. .......................... 360/106; 360/97.01
[58] Field of Search .................... 360/104–106, 360/97.01, 98.01

[56] References Cited

U.S. PATENT DOCUMENTS

| | | | |
|---|---|---|---|
| 4,620,252 | 10/1986 | Bauck et al. | 360/106 |
| 4,916,342 | 4/1990 | Hirano et al. | 360/106 |
| 5,027,242 | 6/1991 | Nishida et al. | 360/106 |
| 5,130,873 | 7/1992 | Yumura et al. | 360/106 |
| 5,134,532 | 7/1992 | Svendsen et al. | 360/106 |
| 5,295,031 | 3/1994 | Wasson | 360/106 |
| 5,343,345 | 8/1994 | Gilovich | 360/106 |

FOREIGN PATENT DOCUMENTS 1-222647  9/1989  Japan.

*Primary Examiner*—John H. Wolff
*Assistant Examiner*—Jefferson Evans
*Attorney, Agent, or Firm*—Antonelli, Terry, Stout & Kraus

[57] ABSTRACT

A rotary information recording/reproducing apparatus has a carriage rotatable by the first and second driving coils about an axis that moves an information recording/reproducing head radially to an associated recording disk for head positioning relative to the disk. The angle between a line connecting the center of the first driving coil and the center of the carriage pivot shaft and a line connecting the head and the center of the carriage pivot shaft is set to be not greater than 90 degrees while the angle formed between the first and second driving coils about the center of the carriage pivot shaft is within the range of from 100 degrees to 150 degrees, whereby reduction in the size and thickness of the apparatus can be achieved. A magnet-yoke assembly, which is subject to a reaction force, is mounted to a base by sheet springs and reaction-force damping members interposed therebetween so that the magnet-yoke assembly is independent from and infinitesimally rotatable relative to the base. The provision of the two driving coils and the reaction-force damping members effectively prevents the carriage pivot system and the disk spindle from being excited by the reaction force to thereby assure a high-speed and highly-accurate head positioning.

39 Claims, 10 Drawing Sheets

ROTARY INFORMATION RECORDING/REPRODUCING APPARATUS CARRIAGE ACTUATOR ARRANGEMENT

BACKGROUND OF THE INVENTION

1. Field of the Invention

The present invention relates to a rotary information recording/reproducing apparatus for turning and positioning a head to a predetermined point on an information recording disk and, more particularly, to a rotary information recording/reproducing apparatus which has a smaller size and can position a head at a high speed and with high accuracy.

2. Description of the Prior Art

A prior art magnetic disk apparatus will be described, taking U.S. Pat. No. 5,027,242 as an example. Information recording disks arranged one above another are driven to rotate at a constant speed by a disk rotating motor fixed to a base. Heads are supported by carriage guide arms through head suspensions in such a manner that each head is floated with a small gap held relative to an associated disk for recording/reproducing information. High-speed and highly accurate positioning of the head is performed by rotatively driving the carriage with a voice coil motor. The carriage is mounted and supported through ball bearings on and by a pivot shaft fixed to the base such that the carriage can rotate about the pivot shaft. The voice coil motor comprises a voice coil, permanent magnets and a yoke. Of these components, the voice coil is attached to the carriage, whereas the permanent magnets and the yoke (both serving as parts of a magnet-yoke assembly) are fixed to the base. Since the voice coil surrounded by the magnet-yoke assembly in sandwiched relation is under the action of a magnetic field, the carriage is rotatively driven when the voice coil is supplied with electric power.

However, when a driving force is generated in the voice coil with the supply of electric power to the voice coil, a resultant reaction force acts on the magnet-yoke assembly of the voice coil motor to vibrate the base, thereby causing vibration excitation of the disk. Also, with the generation of the driving force in the voice coil, translational excitation force acts on the carriage pivot shaft at the same time, thereby vibrating a carriage supporting system. A resultant vibration force acts on the disk driving motor to vibrate it, and hence the disk is further vibrated.

In view of the above problems, the prior art disclosed in Japanese Unexamination Patent Publication No. 1-222647 and U.S. Pat. No. 4,620,252, for example, has been proposed. The prior art apparatus includes two flat type driving coils attached to a carriage on opposite sides of the carriage pivot shaft axis. Two sets of magnet-yoke assembly are arranged in non-contact relation to the driving coils for rotating the carriage by a couple. This arrangement is intended to prevent the translational excitation force from acting on the carriage pivot shaft and to reduce vibration of a structural member caused by the carriage motion.

According to the prior art disclosed in the above-cited Japanese Unexamination Patent Publication No. 1-222647 and U.S. Pat. No. 4,620,252, however, an information recording disk having a sufficiently large outer diameter cannot be accommodated in a housing of the apparatus, making it difficult to provide the apparatus with a large capacity. Specifically, because the two driving coils are attached to the carriage in opposite relation with respect to the axis of the carriage pivot shaft and the magnet-yoke assemblies are arranged around the driving coils, the axis-to-axis distance between the carriage pivot shaft and a disk rotating shaft or spindle must be set to be greater than required in other conventional apparatus using one driving coil, in order to avoid interference between the carriage and the disk. If a disk having a conventional large outer diameter is installed in the apparatus housing, the size of the apparatus must be increased in the longitudinal direction thereof.

Further, in order to satisfy form factor dimensions such as 1.3, 1.8, 2.5, 3.5 or 5.25 inches which are standardized for small-sized magnetic disk apparatus, the disk size must be reduced to such an extent as not departing from the apparatus dimension in the longitudinal direction. This leads to a reduction in storage capacity of the apparatus. In addition, the greater axis-to-axis distance as discussed above enlarges the size of a carriage guide arm, resulting in the increased inertial moment of rotating members. This requires a longer access time and, if the output of a carriage driving motor is increased as measures for avoiding such a drawback, the apparatus size would be necessarily enlarged. Thus, it has been difficult to provide a mechanism which can maintain the apparatus within the standardized form factor dimension, to suppress vibration imparted to a disk via a base or carriage to the extent possible, and to position the head at a high speed and with high accuracy.

SUMMARY OF THE INVENTION

An object of the present invention is to achieve a reduction in both apparatus size and thickness and, hence, to provide a rotary information recording/reproducing apparatus which is within the standardized form factor dimension.

Another object of the present invention is to provide a high-performance rotary information recording/reproducing apparatus equipped with a low-vibration head positioning mechanism in which an information recording disk is prevented from vibrating due to a reaction force generated with driving of a carriage, and a translational excitation force acting on a carriage pivot shaft upon generation of a carriage torque is reduced to the extent possible.

To achieve the above objects, the first feature of the present invention resides in a rotary information recording/reproducing apparatus which includes at least one disk for recording information, a carriage supporting a head to record/reproduce information on or from said disk and being rotatable in the radial direction of said disk to position the head relative to the disk, and a carriage actuator for applying a torque to said carriage, the carriage actuator including two driving coils attached to said carriage and a magnet-yoke assembly which comprises permanent magnets and at least one yoke, said magnet-yoke assembly and said driving coils being attached to said carriage substantially on opposite sides of a carriage pivot shaft axis and at a position just outward of a region where magnetic flux leaking from said magnet-yoke assembly affects said disk.

The second feature of the present invention resides in a rotary information recording/reproducing apparatus including at least one disk for recording information, a carriage supporting a head to record/reproduce information on or from said disk and being rotatable in the radial direction of said disk to position the head relative to the disk, a carriage actuator for applying a torque to said carriage, and a housing comprising a base and a cover to support and accommodate said disk, said head, said carriage and said carriage actuator, the carriage actuator including two driving coils attached to said carriage and a magnet-yoke assembly which comprises permanent magnets and at least one yoke, the arrangement being such that the angle formed between a line connecting the center of the first driving coil and the center of said carriage pivot shaft and another line connecting said head and the center of said carriage pivot shaft is not larger than 90 degrees and that the angle formed between the center lines of the first and second driving coils about the center of said carriage pivot shaft is within the range of from 100 degrees to 150 degrees.

The third feature of the present invention resides in a rotary information recording/reproducing apparatus which includes at least one disk for recording information, a carriage supporting a head to record/reproduce information on or from said disk and being rotatable in the radial direction of said disk to position the head relative to the disk, a carriage actuator for applying a torque to said carriage, and a housing comprising a base and a cover to support and accommodate said disk, said head, said carriage and said carriage actuator, the carriage actuator including two driving coils attached to said carriage and a magnet-yoke assembly which comprises permanent magnets and at lease one yoke, the arrangement being such that the angle formed between a line connecting the center of the first driving coil and the center of said carriage pivot shaft and another line connecting said head and the center of said carriage pivot shaft is not larger than 90 degrees and that the angle formed between the center lines of the first and second driving coils about the center of said carriage pivot shaft is in the range of from 100 degrees to 150 degrees, said first and second driving coils being flat in shape, means for supporting said magnet-yoke assembly, said supporting means being mounted on one surface of said base outwardly of an outer peripheral surface of said magnet-yoke assembly, said magnet-yoke assembly supporting means being arranged to be within the dimension from said one surface of said base to an end face of said magnet-yoke assembly spaced from said one base surface.

In a preferable embodiment of the present invention, said magnet-yoke assembly supporting means includes at least three sheet springs, two assembly-supporting members and reaction-force damping members, said sheet springs being mounted radiating out from said carriage pivot shaft between the outer peripheral surface of said magnet-yoke assembly and said assembly-supporting members such that each of said sheet springs extends perpendicularly to said base and the center of said carriage pivot shaft is positioned in a plane including the sheet spring, said assembly-supporting members being mounted to said base to support said magnet-yoke assembly so as to be independent of said base and infinitesimally rotatable, said reaction-force damping members being plate-shaped members each mounted between the outer peripheral surface of said magnet-yoke assembly and an inner peripheral surface of one of said assembly-supporting members.

Alternatively, the sheet springs may be replaced with ball bearings or sliding bearings. The magnet-yoke assembly supporting means may comprise a dashpot mechanism provided on the outer peripheral surface of the magnet-yoke assembly and an assembly-supporting member for supporting the dashpot mechanism.

Preferably, the yoke of the magnet-yoke assembly may include an outer peripheral portion and an inner portion lying inwardly of the outer peripheral portion, a radial thickness of the outer peripheral portion being greater than an axial thickness of the inner portion. Also preferably, the yoke of said magnet-yoke assembly has a generally semi-circular shape provided with central opening for said carriage and with a cutout formed in continuity with said opening and having diverging edges extending substantially parallel to an outer peripheral edge of said disk, a central angle formed between the diverging edges of said cutout being smaller than 180 degrees.

Further preferably, at least one sheet spring is mounted between the outer peripheral surface of said magnet-yoke assembly and said assembly-supporting member, said sheet spring being fixed to said magnet-yoke assembly and said assembly-supporting member such that said sheet spring extends substantially perpendicularly to said base and the center of said carriage pivot shaft is positioned in a plane including said sheet spring, whereby said magnet-yoke assembly is returned to its neutral position after infinitesimal rotation.

According to the above first feature, since the magnet-yoke assembly is suspended and the driving coils are mounted at a position just outwardly of a region where magnetic flux leaking from the magnet-yoke assembly affects the disk, the axis-to-axis distance between the disk rotating shaft or spindle and the carriage pivot shaft can be reduced while magnetic recording on the disk is kept in a high-accurate state. Therefore, it is also possible to reduce the distance between the head and the center of the carriage pivot shaft, the distance between the center of the carriage pivot shaft and an end face of the apparatus, and further the apparatus size. In addition, since carriage guide arms can be shortened, the inertial moment of the carriage is eventually reduced, resulting in a higher-speed positioning of the head.

According to the above second feature, since the angle formed between a line connecting the center of the first driving coil and the center of the carriage pivot shaft and another line connecting the head and the center of the pivot shaft is not larger than 90 degrees, and the angle formed between the center lines of the first and second driving coils about the center of carriage pivot shaft is in the range of from 100 degrees to 150 degrees, the magnet-yoke assembly surrounding the two driving coils in sandwiched relation can be prevented from interfering with the disk. Also, since the axis-to=axis distance between the spindle and the carriage is reduced, the carriage guide arm can be shortened and the inertial moment of the carriage can be reduced correspondingly. Further, since the two driving coils are mounted around the carriage pivot shaft in angularly spaced relation in the circumferential direction of the shaft axis, the carriage can be rotatively actuated by a force substantially close to a couple so that a translational excitation force acting on the carriage pivot shaft is reduced during the operation. It is to be noted that, when the two driving coils are so mounted as to be spaced 120 degrees, the translational excitation force acting on the carriage pivot shaft can be reduced to a half that produced in the prior art apparatus, and when spaced 150 degrees, it can be reduced to a quarter. This enables the apparatus size to be reduced within any of the standardized form factor dimensions and is also advantageous in respect of high-speed positioning of the head. Additionally, components of the carriage actuator are assembled into an integral unit. The magnet-yoke assembly can be attached to and detached from the apparatus as one unit, resulting in an improvement in assembling efficiency.

Moreover, according to the above third feature, since the two driving coils are flat in shape and the magnet-yoke assembly supporting mean is mounted outwardly of the outer peripheral surface of the magnet-yoke assembly and is arranged to fall within the height from the base surface to the upper end face of the magnet-yoke assembly, the thickness of the apparatus can be reduced remarkably.

In the preferred embodiment, since the magnet-yoke assembly supporting means includes sheet springs, assembly-supporting members and reaction-force damping members, the magnet-yoke assembly is suspended by the supporting means so as to be independent of the base and infinitesimally rotatable and is also supported through a damping structure comprising the reaction-force damping members. Therefore, the structural vibration of the base, due to a reaction-force which is generated in the opposite direction to the driving force can be reduced. As a result, the relative displacement of the head and disk due to structural vibration can be prevented, thereby achieving a high-speed and highly-accurate head positioning. A similar advantage can also be obtained by using ball bearings or sliding bearings instead of the sheet springs, or by employing a combination of dashpot mechanism and assembly-supporting member to construct the magnet-yoke assembly supporting means.

Further, when the yoke of the magnet-yoke assembly is constructed such that the radial thickness of its outer peripheral portion is greater than the axial thickness of its inner portion, a structure is attained in which the inertial moment of the magnet-yoke assembly subjected to the reaction force is much greater than the inertial moment of the rotating members. As a result, the effect of canceling the reaction force imparted to the base is enhanced so that the head and the disk can be more positively prevented from being shifted by vibration of the structural member, thereby achieving a high-speed and highly-accurate head positioning. Also, when the magnet-yoke assembly is provided with a semi-circular opening in its central portion and with a cutout defined by rectilinear edges extending from the center to the outer periphery thereof with a central angle between the edges being not larger than 180 degrees, the entire magnet-yoke assembly can be attached to and detached from the apparatus even in a condition that the carriage and the disk are kept assembled on the apparatus, with a resultant improvement in the assembling efficiency.

Additionally, when the outer peripheral portion of the magnet-yoke assembly and the assembly-supporting member is coupled to each other by at least one sheet spring, a mechanism for returning the magnet-yoke assembly to its neutral position after infinitesimal rotation can be provided to prevent the magnet-yoke assembly and the driving coils from being offset from their initial positions, so as to generate stable driving force at all times, thereby achieving a high-speed and highly-accurate head positioning.

The above and other objects, features and advantages of the present invention will be more apparent from the following description with reference to the accompanying drawings.

DESCRIPTION OF THE PREFERRED EMBODIMENTS

Figure 1:
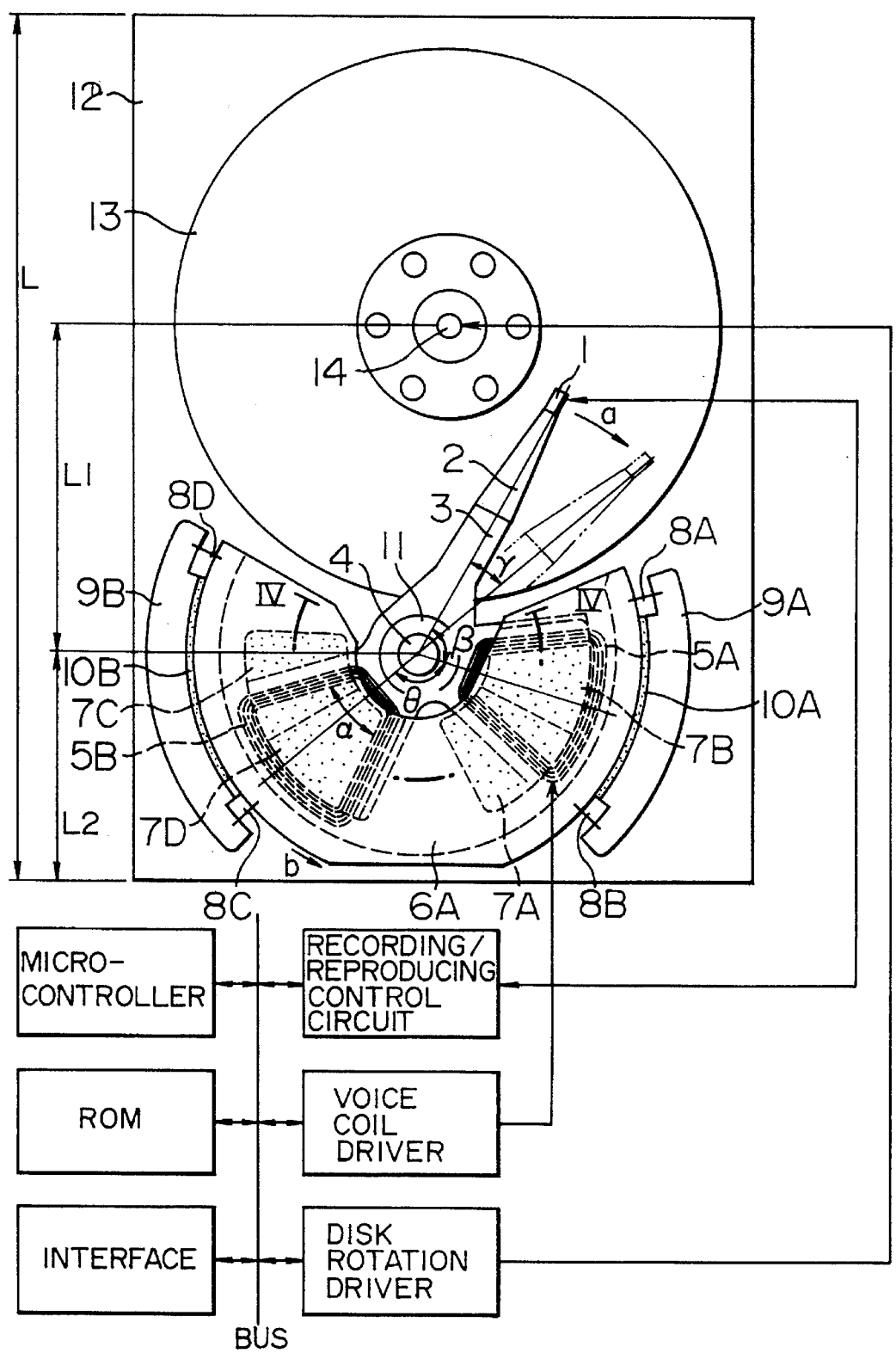
FIG. 1 is a schematic illustration of an entire structure of the first embodiment of a rotary information recording/reproducing apparatus according to the present invention.

Referring to FIG. 1, a plurality of information recording disks 13 arranged one above another in a direction normal to the drawing sheet of FIG. 1 are rotatively driven by a disk rotating motor 14 fixed to a base 12. A head 1 used to record/reproduce information is secured to a carriage 3 through a head suspension 2. Two ball bearings 11 are mounted on a pivot shaft 4 which is fixed to the base 12. The carriage 3 is rotatable about the axis of the pivot shaft 4. The carriage 3 is fixed to outer races of the ball bearings so as to be rotatable about the carriage pivot shaft 4. A voice coil motor constituted by a magnet-yoke assembly, comprising yokes and permanent magnets, and driving coils rotates the carriage 3 for positioning the head to a predetermined point on an associated disk 13 to thereby record or reproduce information.

In this first embodiment, the carriage 3 is provided with two driving coils 5A, 5B, and yokes 6A, 6B (FIG. 3), permanent magnets 7A, 7B, 7C, 7D, etc. are mounted so as to sandwich the driving coils in the direction normal to the drawing sheet.

In a prior art apparatus, the carriage 3 is provided with only one driving coil. This driving coil is mounted such that the center of the driving coil is positioned on an extension of the line connecting the head 1 and the carriage pivot shaft 4. To describe the arrangement with reference to FIG. 1, such a single driving coil is mounted at a point which is slightly angularly shifted from the second driving coil 5B toward the first driving coil 5A. In this arrangement, when electric power is supplied to the driving coil under the action of a magnetic field, a driving force is generated in the driving coil to push an end of the carriage so that a torque is exerted to rotate the carriage about the pivot shaft. As a result, the head can be moved to a predetermined position on the information recording disk. However, because the driving force concomitantly produces a translational excitation force acting on the carriage pivot shaft, a carriage support system is excited to cause vibration which impedes head positioning.

The above drawback can be avoided by arranging two driving coils (twin coils) in opposite relation with respect to the carriage pivot shaft such that a twin-coil separation angle θ, shown in FIG. 1, is set to be 180 degrees. With such an arrangement, only a torque is exerted on the carriage and hence no translational excitation force is generated to act on the carriage pivot shaft. However, because magnet-yoke assembly which surround the driving coils would interfere with a disk, the axis-to-axis distance $L_1$ between the disk rotating shaft or spindle and the carriage pivot shaft must be set to be greater than in the conventional apparatus using one driving coil. Although the distance $L_2$ between the center of the carriage pivot shaft and the end face of the apparatus is reduced to some extent, the distance $L_1$ is increased and, eventually, the apparatus size L in the longitudinal direction cannot be reduced. Also, the greater distance $L_1$ necessarily entails a longer distance between the head and the center of the carriage pivot shaft. As a result, the increased inertial moment of the carriage 3 gives rise to an obstacle against high-speed head positioning.

In this embodiment, for achieving a further reduction in size of small-sized magnetic disk apparatus within the standardized form factor dimension and suppressing a translational excitation force generated during operation and acting on the carriage pivot shaft, the angle β defined between a line connecting the head 1 and the center of the carriage pivot shaft 4 and the center line of the first driving coil 5A is set to be not larger than the right angle (90 degrees), and the twin-coil separation angle θ is set to be about 120 degrees. Additionally, the magnet-yoke assembly comprising the yokes and the permanent magnets is connected to assembly-supporting members 9A, 9B by assembly-supporting sheet springs 8A, 8B, 8C, 8D, etc., and reaction-force damping members 10A, 10B are mounted between the yokes and the assembly-supporting members.

Figure 2:
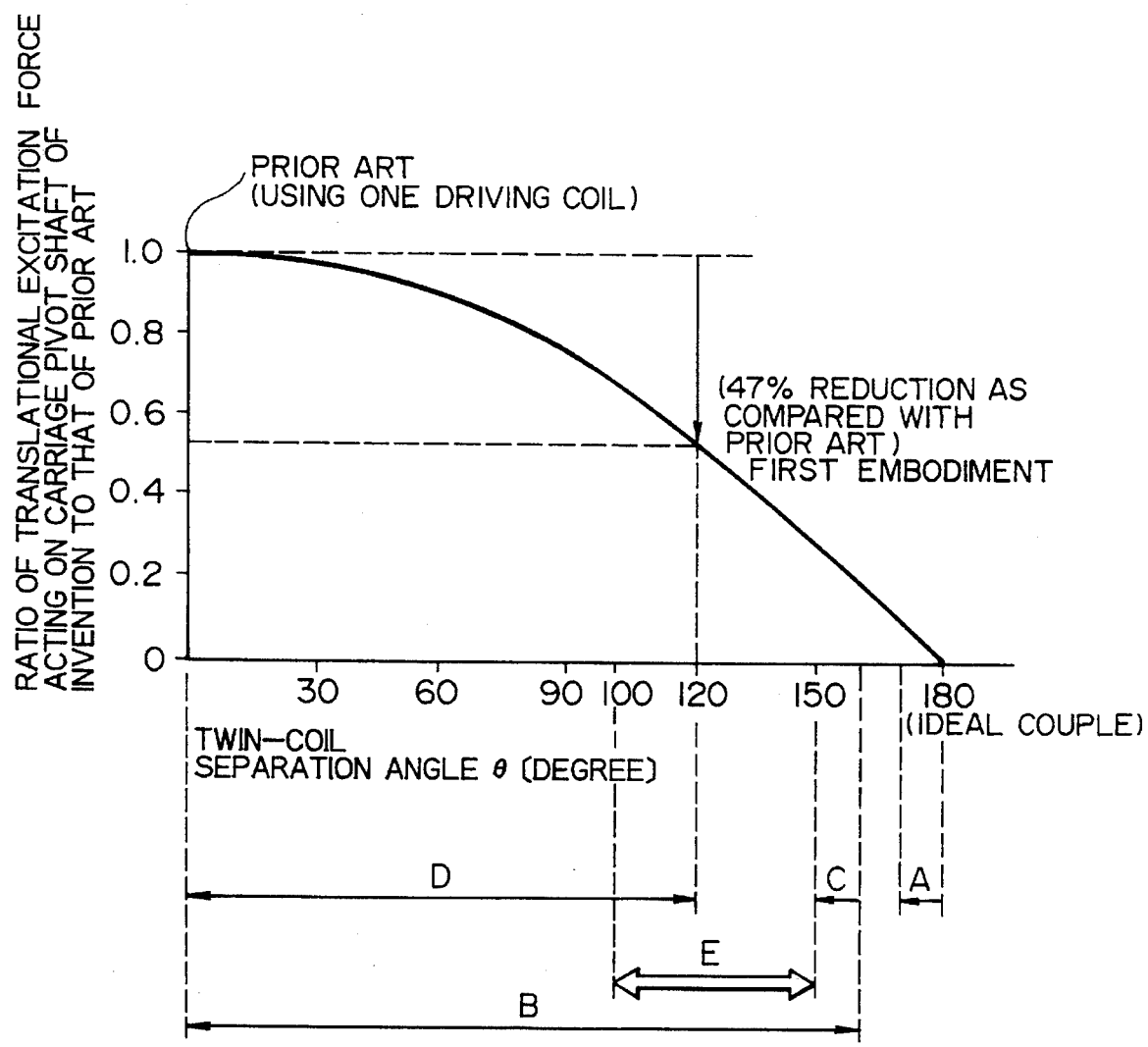
FIG. 2 is a graph showing the relationship between a twin-coil separation angle and a translational excitation force acting on a carriage pivot shaft, and the range in which the standardized form factor dimension is satisfied.

An advantage of the above-described structure will be described below with reference to FIG. 2. In the graph of FIG. 2, the abscissa represents the twin-coil separation angle θ, and the ordinate represents the translational excitation force acting on the carriage pivot shaft with one produced in the prior art apparatus taken as a reference. In the prior art apparatus, a single driving coil has two surfaces each being under the action of a magnetic field to generate a driving force, and the angle α (see FIG. 1) defined between the lengths of the two surfaces is about 45 degrees. Assuming that the translational excitation force acting on the carriage pivot shaft during the operation of the prior art apparatus is 1.0, as the twin-coil separation angle θ increases, the translational excitation force acting on the carriage pivot shaft is reduced and becomes zero at θ of 180 degrees, i.e., when the carriage is driven by the ideal couple.

In the range of the angle θ denoted by A in FIG. 2, however, the apparatus size exceeds the standardized form factor dimension for the above-described reason that the distance $L_2$ is increased. The voice coil motor can be constructed without increasing the axis-to-axis distance $L_1$ between the spindle and the carriage pivot shaft in the range denoted by B, but if the range B is exceeded by the angle θ, the axis-to-axis distance $L_1$ must be increased because of interference between the disk and the carriage. As a result, a carriage guide arm must be made longer, which increases the inertial moment of the carriage and hence impedes high-speed head positioning. In the range denoted by C, the axis-to-axis distance $L_1$ is not required to be increased, but the voice coil motor and the disk are so close to each other, so that the magnetic flux leaking from the magnet-yoke assembly affects the disk. Further, in the range denoted by D, the magnet-yoke assembly which has been assembled into a unit can be mounted after the carriage is installed. Thus, the assembling efficiency is improved if the apparatus is constructed with the angle θ set to be within the range D. However, the translational excitation force acting on the carriage pivot shaft would be increased unless the twin-coil separation angle θ is set to be as large as possible.

Taking into account the conditions discussed above, the range denoted by E is an advantageous range for practical use. In other words, the twin-coil separation angle θ may preferably be in the range from 100 to 150 degrees. The translational excitation force acting on the carriage pivot shaft is reduced to a half of that generated in the prior art apparatus at the angle θ of 120 degrees, and to a quarter at θ of 150 degrees. Considering the twin-coil separation angle θ from the viewpoint of a geometrical positional relationship between components of the apparatus, if the angular range in which the carriage 3 shown in FIG. 1 can be rotated radially of the disk is defined as angle γ, the ratio of θ/γ is in the range of from 4.5 to 6.8 since γ is about 22 degrees. Also, since the angle β formed between the line connecting the head 1 and the center of the carriage pivot shaft 4 and the center line of the first driving coil 5A is in the range of from 70 to 80 degrees, the ratio of β/γ is in the range of from 3.1 to 3.6 with the above value of the angle γ taken as a reference.

Figure 3:
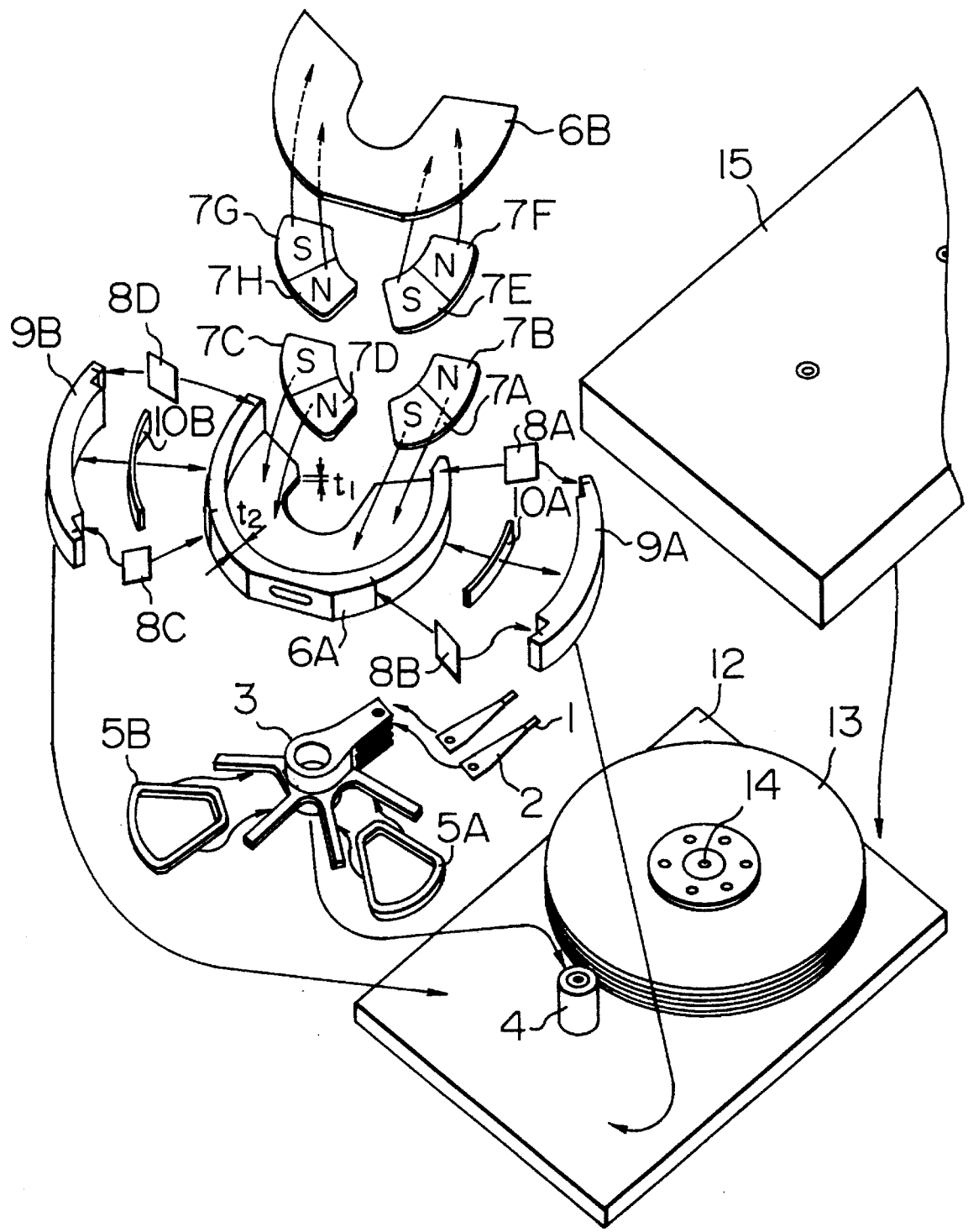
FIG. 3 is an exploded view showing various components of the embodiment shown in FIG. 1 and the mutual positional relationship between these components in an assembled state.

The magnet-yoke assembly of the present invention will be described with reference to FIG. 3. FIG. 3 is an exploded view of the components of the apparatus of the invention shown in FIG. 1, showing that the components are assembled following associated arrows. The magnet-yoke assembly is constructed by adhesively fixing two pairs of permanent magnets 7A, 7B and 7C, 7D to the yoke 6A, each pair of adjacent magnets having different polarities, adhesively fixing two pairs of permanent magnets 7E, 7F and 7G, 7H to the yoke 6B, each pair of adjacent magnets also having different polarities, and then fixing the yokes 6A, 6B together by means of an adhesive or screws into an integral unit. The positions of the permanent magnets 7A to 7H on the yokes 6A and 6B are determined solely depending on the positions of the driving coils 5A, 5B. Since the yokes 6A, 6B each have a semicircular cutout or notch in its central portion, the assembled unit can easily be detached from and attached to the apparatus by removing a cover 15 even in a condition that the carriage 3 and the information recording disks 13 are installed in the apparatus housing. Incidentally, the central angle formed between rectilinear edges of each of the yokes 6A, 6B extending from the inner to outer periphery is set to be smaller than 180 degrees so that the volumes of the yokes are as large as possible to improve the characteristics of the magnetic circuit.

Figure 4:
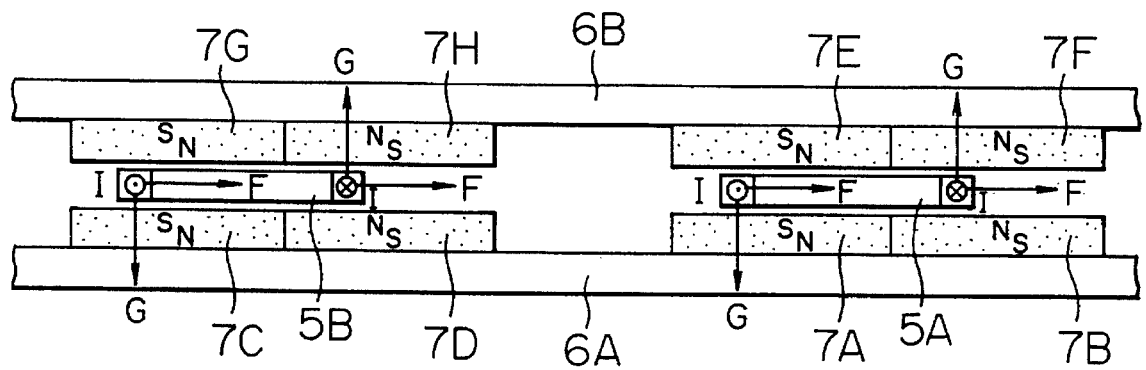
FIG. 4 is a sectional view of a carriage actuator taken along line IV—IV in FIG. 1.

The structure of the magnet-yoke assembly of this embodiment will be described below in more detail with reference to FIG. 4. As shown in FIG. 4, the two pairs of permanent magnets 7A, 7B and 7C, 7D are arranged such that each adjacent pair of magnets have different polarities and are adhesively fixed to the yoke 6A, whereas other two pairs of permanent magnets 7E, 7F and 7G, 7H are arranged such that each adjacent pair of magnets have different polarities and are adhesively fixed to the yoke 6B, as has previously been described. A magnetic field G acts upwardly on the right-hand windings, as viewed in FIG. 4, of the first driving coil 5A while the magnetic field G acts downwardly on the left-hand windings thereof. A magnetic field acts on windings of the second driving coil 5B in similar directions.

Under this condition, when a current is supplied to the driving coils 5A, 5B in a direction perpendicular to the drawing sheet of FIG. 4, force F is generated in directions indicated by arrows. When a current is supplied in the opposite direction, a force is generated in a reversed direction. These thrusts drive the carriage to rotate.

A description will now be made of a magnet-yoke assembly supporting mechanism for suppressing vibration imparted to a structural member of the apparatus due to a reaction force which is generated upon driving of the carriage. The magnet-yoke assembly in its entirety is supported independently of the base 12, as shown in FIG. 1, by four sheet springs 8A to 8D arranged radially with respect to the axis of the carriage pivot shaft 4 and the reaction-force damping members 10A, 10B. Slits are formed in the yoke 6A and the assembly-supporting members 9A, 9B. The sheet springs 8A to 8D are each fitted at both ends into the corresponding slits and are adhesively fixed to the holding members 9A, 9B such that each sheet spring extend perpendicularly to the base 12 and the axis of the carriage pivot shaft 4 is positioned in a plane including the sheet springs. This arrangement allows the entire magnet-yoke assembly to rotate infinitesimally about the carriage pivot shaft 4. The yoke 6A is held independently of the base 12, but the assembly-supporting members 9A, 9B are fixed to the base 12 by means of an adhesive or screws or may alternatively be fabricated as integral projections on the base 12. The yoke 6A and the assembly-supporting members 9A, 9B are bonded to each other with plate-shaped reaction-force damping members 10A, 10B interposed respectively therebetween. The damping members 10A, 10B are preferably made of silicon-based gel or rubber materials.

With the construction described above, when the head is driven, for example, in the direction indicated by an arrow a in FIG. 1, the magnet-yoke assembly supported by the sheet springs 8A to 8D and the reaction-force damping members 10A, 10B is rotated infinitesimally about the carriage pivot shaft 4 in the direction indicated by an arrow b due to the reaction force caused by carriage actuation. The infinitesimal rotation of the magnet-yoke assembly causes shearing forces to act on the reaction-force damping members 10A, 10B thereby absorbing the vibration energy produced with the infinitesimal rotation. As a result, the structural vibration due to the reaction force caused by carriage actuation can be suppressed and hence vibration tending to impede head positioning can be reduced. Ideally, if the inertial moment of the entire magnet-yoke assembly, being subjected to the reaction force, about the carriage pivot shaft is much greater than the inertial moment of all the rotating members, including the carriage 3 on which the head 1 is mounted, about the carriage pivot shaft, the vibration imparted to the structural member due to the reaction force can be prevented. In this embodiment, therefore, the yoke 6A is shaped to have a radial thickness $t_2$ in its outer peripheral portion greater than an axial thickness $t_1$ in its central portion, as shown in FIG. 3, so that a larger part of the mass of the yoke 6A is concentrated to the outer peripheral portion to increase the total inertial moment of the magnet-yoke assembly.

Additionally, to satisfy the standardized form factor dimension, the assembly-supporting structure is mounted in an empty space along an outer periphery of the magnet-yoke assembly. Furthermore, to reduce the thickness of the supporting structure, the height of the supporting structure is set to fall within the distance h (see FIG. 9) between the upper end face of the magnet-yoke assembly (i.e., the upper surface of the yoke 6B) and the upper surface of the base 12.

Figure 5:
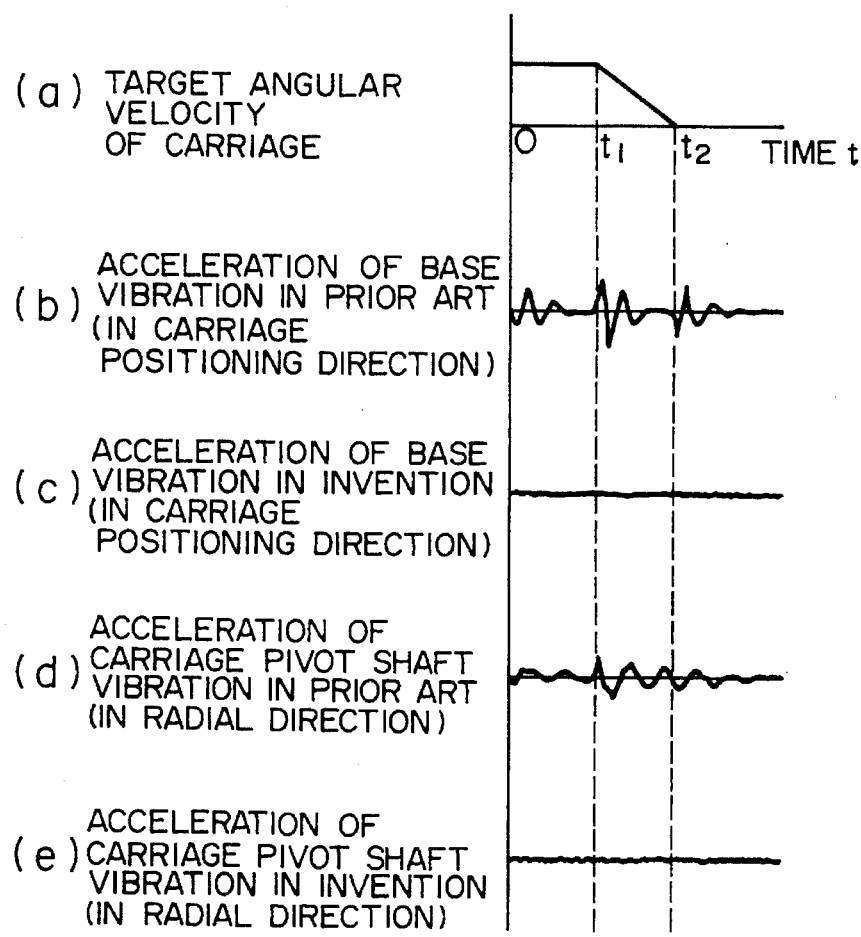
FIG. 5 is a timing chart showing an advantage of the present invention.

An advantage of the above-described construction will be described below with reference to FIG. 5. FIG. 5 is a timing chart with the abscissa representing time, in which (a) indicates a target angular velocity of the carriage and (b) indicates an acceleration of base vibration (in the carriage positioning direction) in the prior art apparatus. As will be seen in FIG. 5, there occurs residual vibration caused by the structural vibration due to the reaction force even after the positioning, i.e., after the elapse of time $t_2$. Also, (c) indicates an acceleration (in the carriage positioning direction) of base vibration in the inventive apparatus. Residual vibration is held small throughout the operation time, including a period after the positioning, due to the effect given by the non-reacting support structure of the magnet-yoke assembly. Further, (d) indicates an acceleration (in the radial direction) of carriage pivot shaft vibration in the prior art apparatus. Because the carriage rear end is driven by one driving coil in the prior art apparatus, a translational excitation force is generated on the carriage pivot shaft and lasts to generate vibration even after the positioning. Finally, (e) indicates an acceleration of carriage pivot shaft vibration (in the radial direction) in the inventive apparatus. With the structure that the carriage is driven by the two driving coils, vibration is held small not only during the positioning but also after the positioning.

Figure 6:
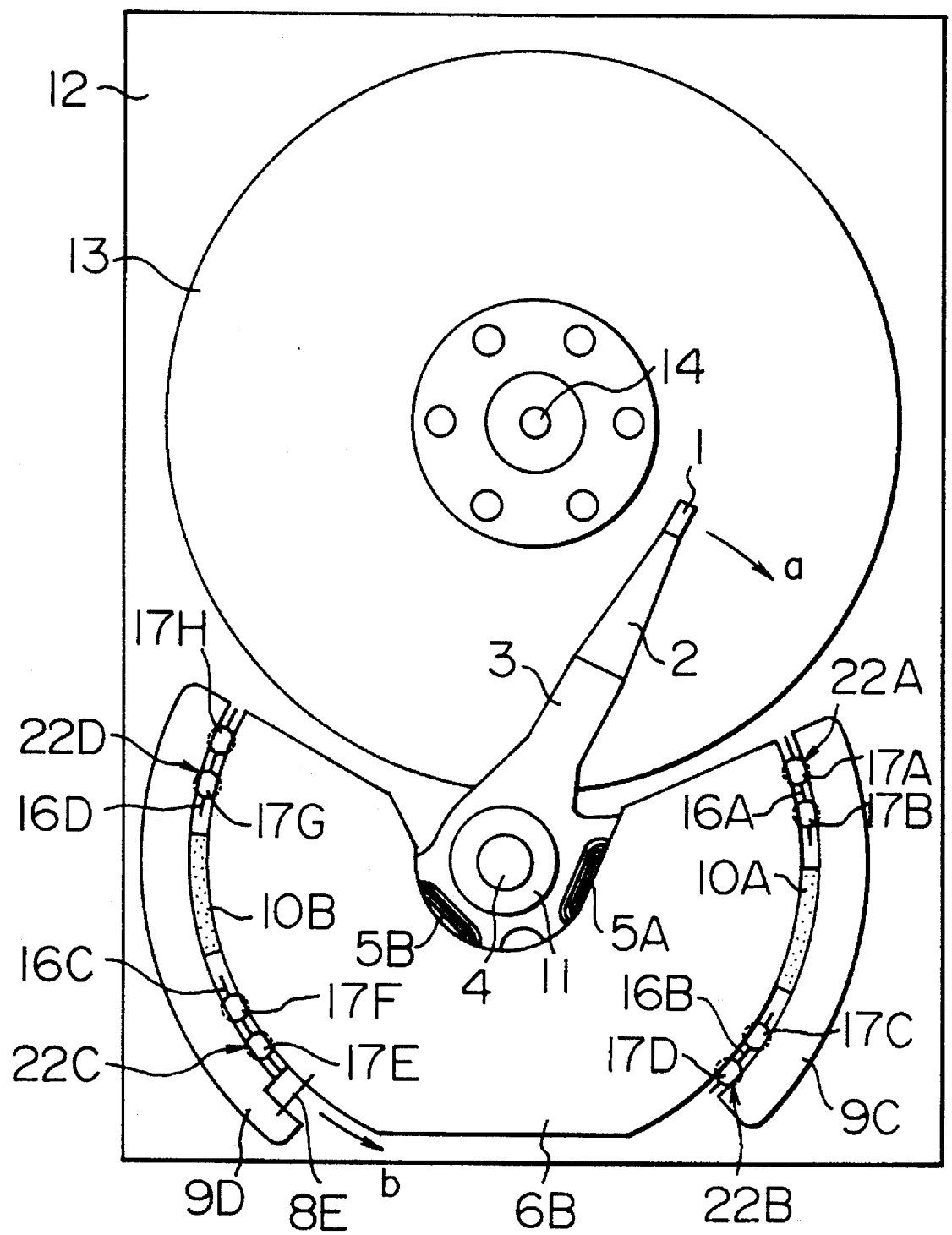
FIG. 6 is a schematic illustration similar to FIG. 1, but showing the second embodiment of the present invention.
Figure 7:
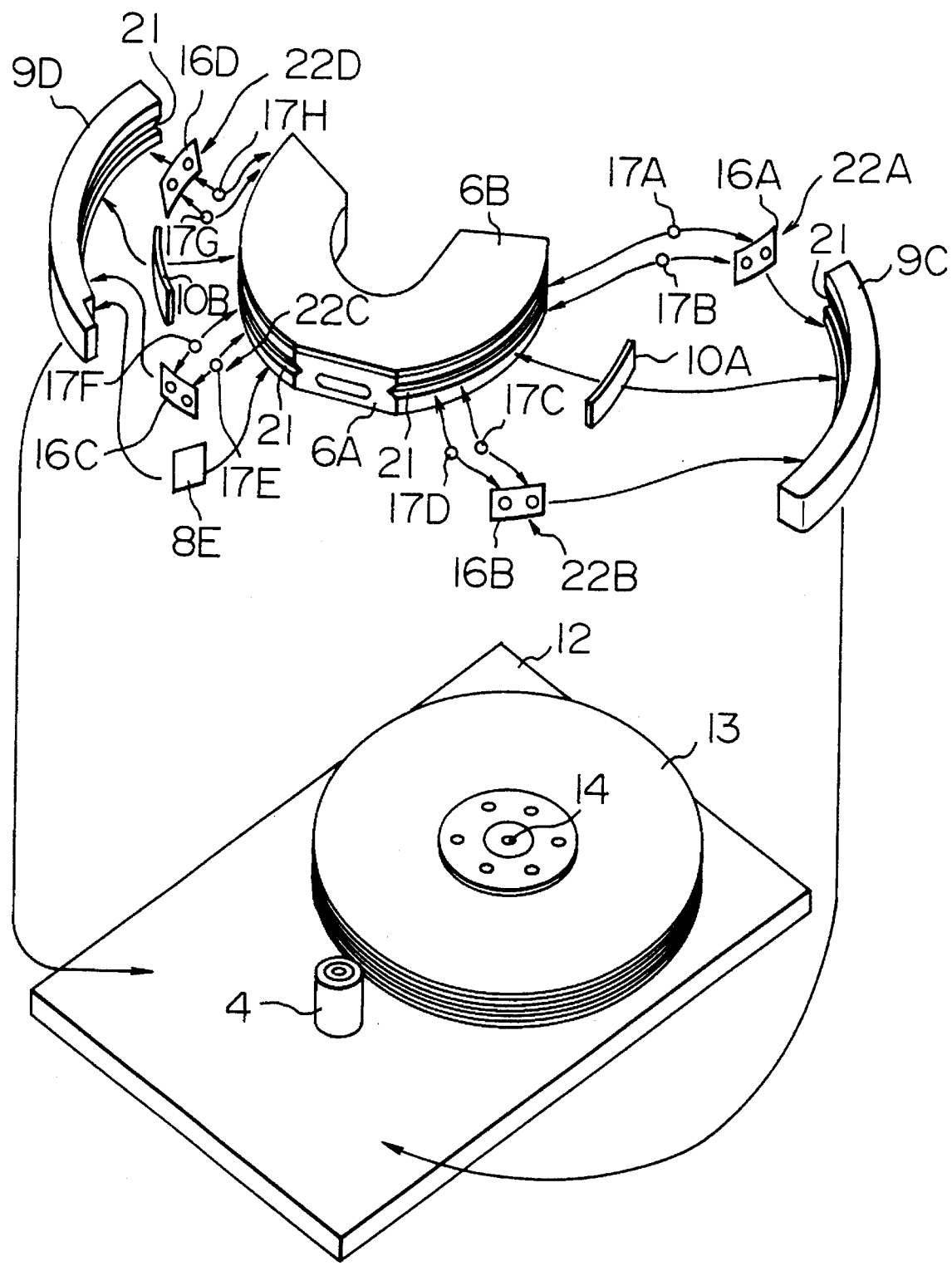
FIG. 7 is an exploded view showing various components of the embodiment shown in FIG. 6 and the mutual positional relationship between these components in an assembled state.

The second embodiment of the present invention will be described below with reference to FIGS. 6 and 7. In FIGS. 6 and 7, the same reference numerals as those in FIGS. 1 to 3 denote the same or identical components as or to those in the first embodiment. Between two pairs of V-shaped grooves 21 formed in an outer peripheral surface of the yoke 6A and inner peripheral surfaces of assembly-supporting members 9C, 9D, four ball bearings 22 comprising balls 17A to 17H and races 16A to 16D are mounted to support the entire magnet-yoke assembly, including the yoke 6B, independently of the base 12 so that the magnet-yoke assembly is infinitesimally rotatable about the carriage pivot shaft 4. Also, similarly to the preceding embodiment, the reaction-force damping members 10A, 10B are mounted respectively between the outer peripheral surface of the yoke or the magnet-yoke assembly and the inner peripheral surfaces of the assembly-supporting members 9C, 9D. As will be seen from FIG. 6, the ball bearings 22A to 22D and the reaction-force damping members 10A, 10B are arranged in the circumferential direction of the yoke 6A.

The mutual positional relationship between the components will be apparent from FIG. 7. In this embodiment, a single sheet spring 8E is provided at a position corresponding to the position of the sheet spring 8C in the embodiment shown in FIG. 1. The sheet spring 8E extends perpendicularly to the base 12 and is arranged radially of the axis of the carriage pivot shaft 4. After the entire magnet-yoke assembly has been rotated infinitesimally due to the reaction force caused by carriage driving, the sheet spring 8E functions to return the entire magnet-yoke assembly to its neutral position. With the addition of such a return mechanism, initial positions of the magnet-yoke assembly and the driving coils will not be offset so as to generate stable driving force at all times, thereby ensuring precise positioning of the head 1.

Figure 8:
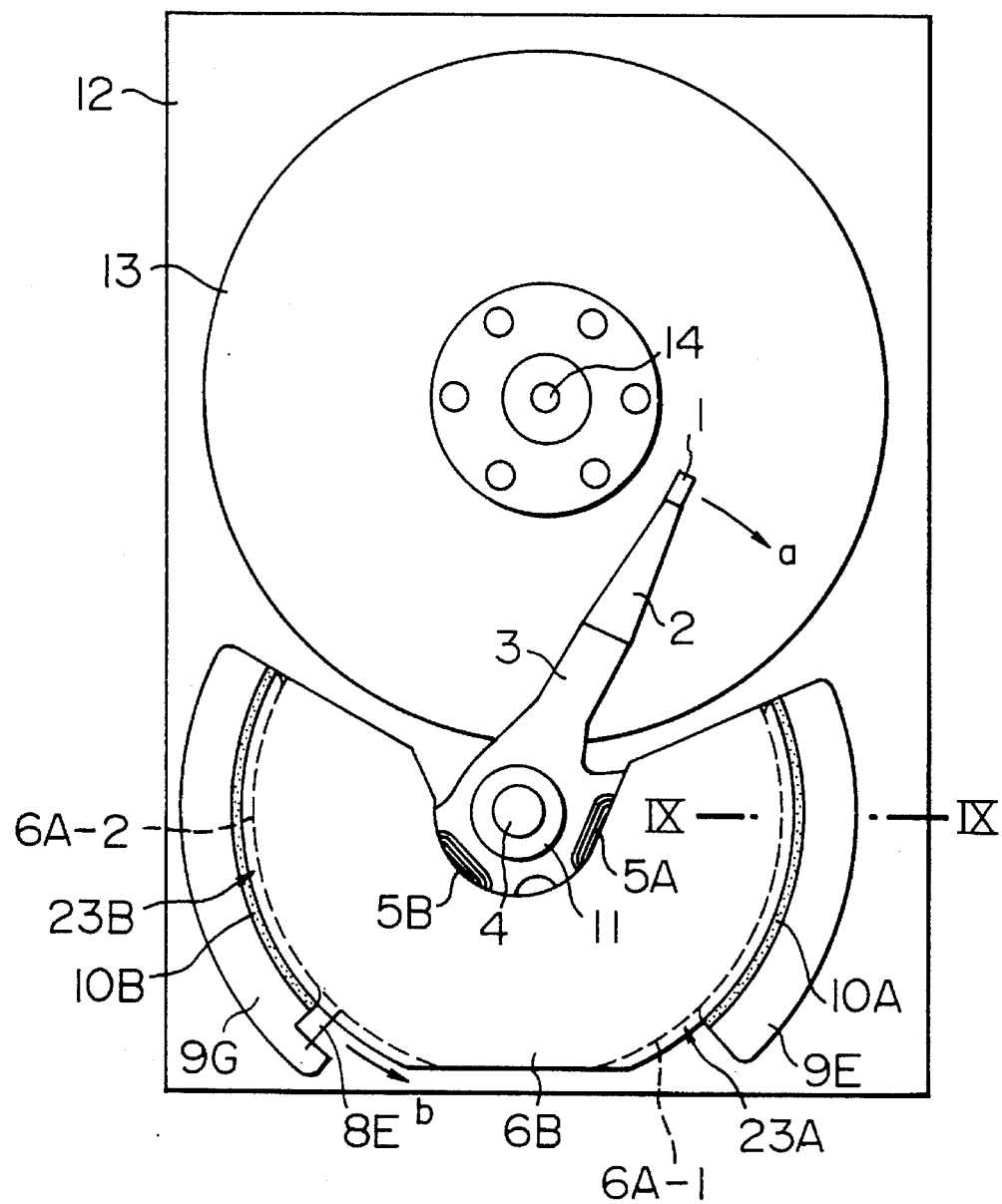
FIG. 8 is a schematic illustration similar to each of FIGS. 1 and 6, but showing the third embodiment of the present invention.
Figure 9:
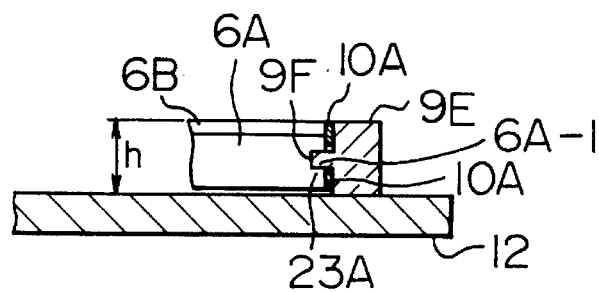
FIG. 9 is a sectional view taken along line IX—IX in FIG. 8.

The third embodiment of the present invention will be described below with reference to FIGS. 8 to 12. In FIG. 8, the same reference numerals as those in FIGS. 1 to 3 denote the same or identical components. The entire magnet-yoke assembly including the yoke 6B is supported independently of the base 12 by a magnet-yoke assembly supporting mechanism comprising sliding bearings 23A, 23B. FIG. 9 shows a structure of one sliding bearing 23A. A groove 6A-1 is formed in the outer peripheral surface of the yoke 6A, and a projection 9F is provided on an inner peripheral surface of an assembly-supporting member 9E and slidably engaged in the groove 6A-1. With such an arrangement, the entire magnet-yoke assembly is supported independently of the base 12 so that the magnet-yoke assembly is infinitesimally rotatable about the carriage pivot shaft 4. The assembly-supporting member 9E is formed of, e.g., Teflon or any other suitable material. The other assembly-supporting member 9G is provided with a similar projection (not shown) which is engaged in a groove 6A-2 formed in the yoke 6A to thereby constitute the sliding bearing 23B.

Figure 10:
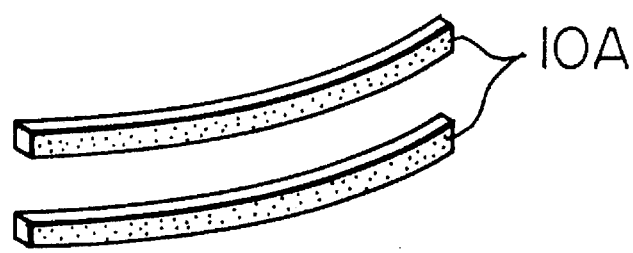
FIG. 10 is a perspective view of a reaction-force damping member for use in the embodiment shown in FIG. 8.
Figure 11:
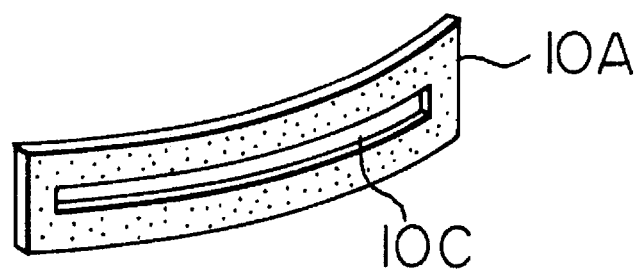
FIG. 11 is a perspective view of a modification of the reaction-force damping member shown in FIG. 10.
Figure 12:
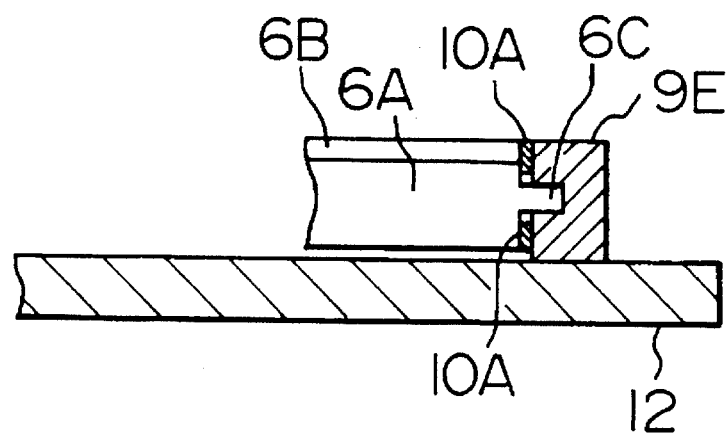
FIG. 12 is a sectional view of a modification of the embodiment shown in FIG. 9.

Reaction-force damping members 10A, 10B are mounted respectively between the magnet-yoke assembly and the assembly-supporting members 9F, 9G. Each of the reaction-force damping members may comprise two pieces mounted one on the upper or lower side of the projection 9F on the assembly-supporting member, as shown in FIG. 10, or may be of a single rectangular piece having a slit 10C which slidably receives the projection 9F, as shown in FIG. 11. While the grooves of the sliding bearings are formed in the yoke 6A in this embodiment, the embodiment may be modified such that a projection 6C is provided on the outer peripheral surface of the yoke 6A and a groove is formed in each of the assembly-supporting members 9E, 9G so that the two members slidably engage with each other. Further, this embodiment includes a mechanism for returning the carriage to its neutral position by the sheet spring 8E after an infinitesimal rotation, as in the second embodiment.

Figure 13:
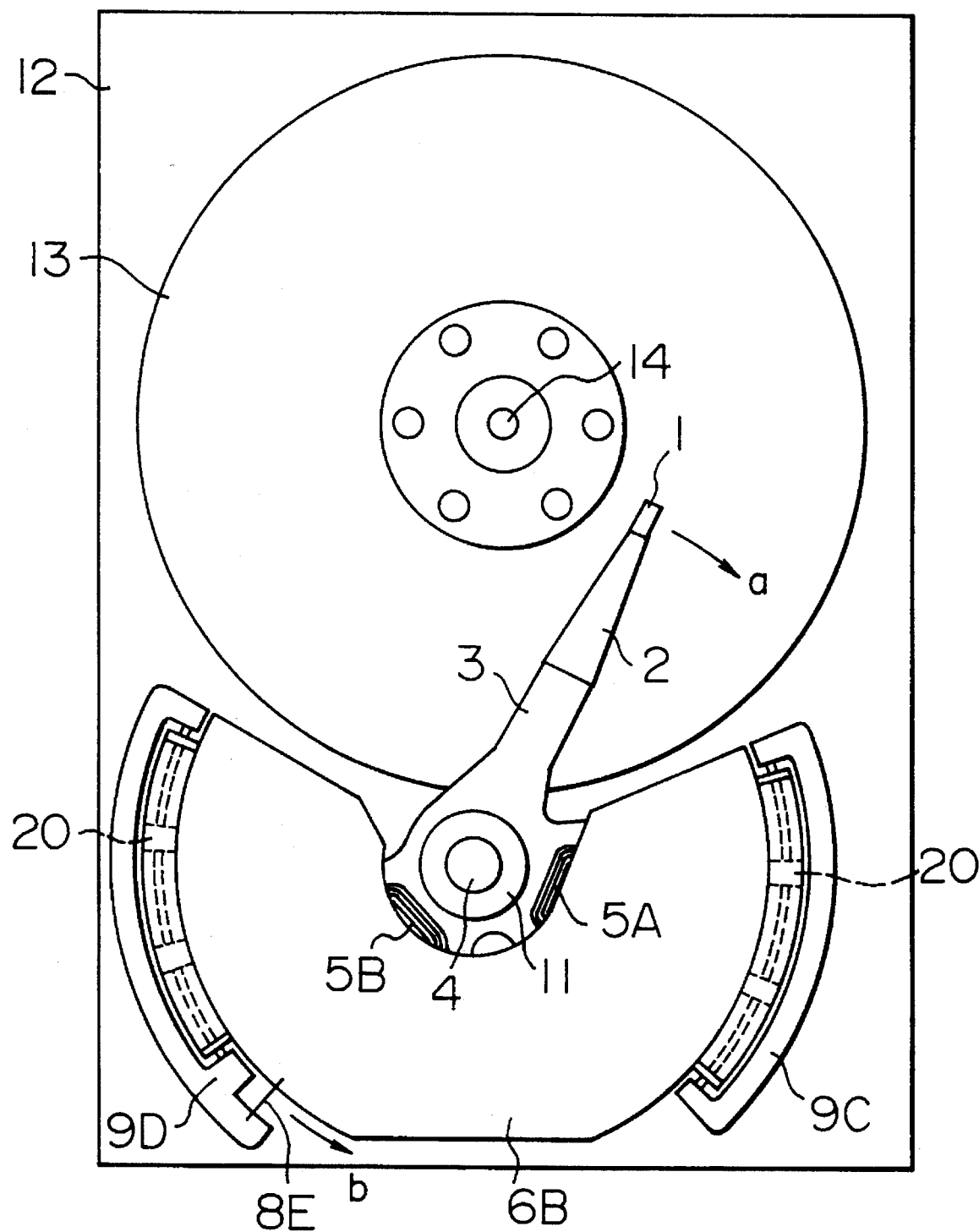
FIG. 13 is a schematic illustration of an entire structure of the fourth embodiment of the present invention.

The fourth embodiment of the present invention will be described below with reference to FIGS. 13 to 14. In FIG. 13, the same reference numerals as those in FIGS. 1 to 3 denote the same or identical components. In this embodiment, the entire magnet-yoke assembly including the yoke 6B is supported by two dashpot mechanisms 20 which also provide a reaction-force damping effect. Further, this embodiment includes the mechanism for returning the carriage to its neutral position by the sheet spring 8E after the infinitesimal rotation, as in the above embodiments.

Figure 14:
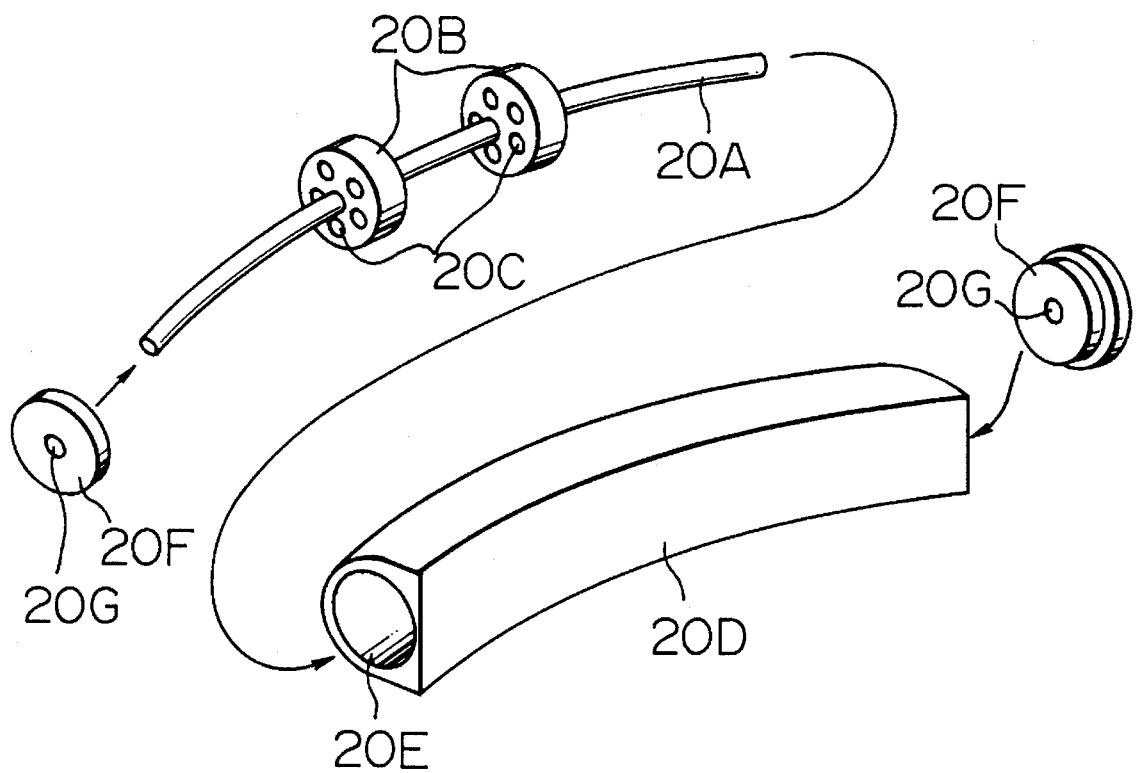
FIG. 14 is an exploded view showing various components of a dashpot mechanism for use in the embodiment shown in FIG. 13 and the mutual positional relationship between these components in an assembled state.

As shown in FIG. 14, the dashpot mechanisms 20 are each structured such that coaxially mounted on an arcuate shaft 20A are two pistons 20B each provided with a plurality of through holes 20C parallel to the shaft 20A, to thereby construct an assembly, this piston-shaft assembly is accommodated in an arcuate housing 20D having a hole (cavity) 20E adapted to slidably receive those pistons, and both ends of the arcuate housing 20D are covered by covers 20F. The arcuate housing 20D is fixed to the outer peripheral surface of the magnet-yoke assembly such that both ends of the shaft 20A project outwardly through openings 20G in the covers 20F. The projecting ends of the arcuate shaft 20A are fixed to the base 12 through the assembly-supporting members 9C, 9D, whereby the entire magnet-yoke assembly is supported independently of the base 12 so that the magnet-yoke assembly is infinitesimally rotatable about the carriage pivot shaft 4. When the magnet-yoke assembly vibrates infinitesimally in response to the reaction force caused by carriage actuation during the operation, air in the arcuate housing 20D is forced to flow through the piston holes 20C, thereby providing a reaction-force damping effect. A similar advantage can also be obtained by fixing the arcuate housing 20D to each of the assembly-supporting members 9C, 9D and fixing both ends of the arcuate shaft 20A to the outer peripheral surface of the magnet-yoke assembly conversely to the above structure.

According to several embodiments described above, the carriage is provided with two flat-type driving coils, the angle β0 formed between the center line of the first driving coil and the carriage guide arm is set to be not larger than 90 degrees, the angle θ formed between the respective center lines of the first and second driving coils is set to about 120 degrees, the magnet-yoke assembly comprises two yokes sandwiching both sides of the driving coils and permanent magnets, and further the assembly-supporting mechanism is mounted outwardly of the outer peripheral surface of the magnet-yoke assembly and also arranged within the height from the base surface to the upper end face of the magnet-yoke assembly. Therefore, the apparatus can be so reduced in size and thickness that the apparatus falls within the form factor dimensions standardized for small-sized magnetic disk apparatus. Consequently, by employing the present invention a positioning mechanism is provided that satisfies any of the standardized form factor dimensions for small-sized magnetic disk apparatus, such as 1.3", 1.8", 2.5", 3.5" and 5.25", and is less liable to be subjected to vibration.

Also, since the carriage is rotatively actuated by forces close to a couple, a translational excitation force acting on the carriage pivot shaft can be reduced. Further, of the components of the carriage driving voice coil motor, the magnet-yoke assembly comprising the yokes and the permanent magnets is held by the magnet-yoke assembly supporting mechanism such that the magnet-yoke assembly is independent of the base and is infinitesimally rotatable and is mounted on the base through the reaction-force damping members. It is therefore possible to reduce structural vibration of the base, due to a reaction-force which is generated in the opposite direction to the driving force. As a result of the above structure, the relative displacement of the head and disk due to structural vibration can be prevented to assure a high-speed and highly-accurate head positioning.

Further, since the yoke of the magnet-yoke assembly is constructed to have a radial thickness in its outer peripheral portion greater than an axial thickness in its central portion, the inertial moment of the magnet-yoke assembly subjected to the reaction force can be much greater than the inertial moment of the rotating members. As a result, the effect of canceling the reaction force imparted to the base is enhanced so that the relative positions of the head and the disk can be more positively prevented from being changed by vibration of the structural member, enabling a high-speed and highly-accurate head positioning to be achieved.

Since the magnet-yoke assembly is provided in its central portion with a semicircular cutout for avoiding interference with the carriage and has a cutout defined by rectilinear edges extending from the center to the outer peripheral portion of the magnet-yoke assembly with a central angle smaller than 180 degrees defined between the edges and positioned to avoid interference with information recording disk, the entire magnet-yoke assembly can be detached from the apparatus even in a condition that the carriage and the information recording disk are installed in the apparatus housing, with a resultant improved assembling efficiency.

Additionally, since the magnet-yoke assembly capable of infinitesimally rotatable is provided with a mechanism for returning the carriage to its neutral position after the infinitesimal rotation, initial positions of the magnet-yoke assembly and the driving coils will not be offset to thereby generate stable driving force at all times and enables a high-speed and highly-accurate head positioning to be achieved.

In short, according to the present invention, by prescribing positions of two driving coils, the apparatus can be reduced in both size and thickness so that the apparatus falls within any of the form factor dimensions standardized for small-sized magnetic disk apparatus. Also, vibration of a carriage supporting system can be suppressed by actuating the carriage with the two coils, and vibration of a structural member due to a reaction force can be prevented by supporting the magnet-yoke assembly in a reaction-force damping manner, making it possible to position a head at a high speed and with high accuracy. As a result, a high-speed and highly-accurate rotary information recording/reproducing apparatus having a reduced size and thickness can be achieved.

What is claimed is:

1. A rotary information recording/reproducing apparatus including at least one disk for recording information, a carriage supporting a head to record/reproduce information on or from said disk and being rotatable in a substantially radial direction of said disk to position said head relative to said disk, a carriage actuator for applying a torque to said carriage, and a housing comprising a base and a cover to support and accommodate said disk, said head, said carriage and said carriage actuator, said carriage actuator including two driving coils fixed to said carriage and a magnet-yoke assembly which comprises permanent magnets and at least one yoke, the arrangement being such that an angle formed between a line connecting a center of the first driving coil and a center of a carriage pivot shaft and another line connecting said head and the center of said carriage pivot shaft is not larger than 90 degrees and that an angle formed between the center lines of the first and second driving coils about the center of said carriage pivot shaft is within the range of from 100 degrees to 150 degrees, said first and second driving coils being flat in shape, means for supporting said magnet-yoke assembly, said supporting means being mounted on one surface of said base outwardly of an outer peripheral surface of said magnet-yoke assembly, said magnet-yoke assembly supporting means being arranged to be within a distance between said one surface of said base and an end face of said magnet-yoke assembly spaced from said one base surface.

2. A rotary information recording/reproducing apparatus according to claim 1, wherein said magnet-yoke assembly supporting means includes at least three sheet springs, two assembly-supporting members and reaction-force damping members, said sheet springs being mounted radiating out from said carriage pivot shaft between the outer peripheral surface of said magnet-yoke assembly and said assembly-supporting members such that each of said sheet springs extends perpendicularly to said base and the center of said carriage pivot shaft is positioned in a plane including the sheet spring, said assembly-supporting members being fixed to said base to support said magnet-yoke assembly so as to be independent of said base and infinitesimally rotatable, said reaction-force damping members being plate-shaped members each mounted between the outer peripheral surface of said magnet-yoke assembly and an inner peripheral surface of one of said assembly-supporting members.

3. A rotary information recording/reproducing apparatus according to claim 2, wherein the yoke of said magnet-yoke assembly has a generally semicircular shape provided with a central opening for said carriage and with a cutout formed in continuity with said opening and having diverging edges extending substantially parallel to an outer peripheral edge of said disk, a central angle formed between the diverging edges of said cutout being smaller than 180 degrees.

4. A rotary information recording/reproducing apparatus according to claim 2, wherein the yoke and the permanent magnet of said magnet-yoke assembly are so structured as to be detachable from said apparatus in a condition that said yoke and said permanent magnet are assembled into an integral unit.

5. A rotary information recording/reproducing apparatus according to claim 2, wherein the yoke of said magnet-yoke assembly includes an outer peripheral portion and an inner portion lying inwardly of said outer peripheral portion, a radial thickness of said outer peripheral portion being greater than an axial thickness of said inner portion.

6. A rotary information recording/reproducing apparatus according to claim 5, wherein said magnet-yoke assembly supporting means includes a ball bearing, a assembly-supporting member, and a reaction-force damping member, said ball bearing comprising a plurality of balls and races mounted between V-shaped grooves formed respectively in the outer peripheral surface of said magnet-yoke assembly and an inner peripheral surface of said assembly-supporting member, said assembly-supporting member being fixed to said base to support said magnet-yoke assembly so as to be independent of said base and infinitesimally rotatable, said reaction-force damping member being a plate-shaped member mounted between the outer peripheral surface of said magnet-yoke assembly and the inner peripheral surface of said assembly-supporting member.

7. A rotary information recording/reproducing apparatus spring is mounted between the outer peripheral surface of said magnet-yoke assembly and said assembly-supporting member, said sheet spring being fixed to said magnet-yoke assembly and said assembly-supporting member such that said sheet spring extends substantially perpendicularly to said base and the center of said carriage pivot shaft is positioned in a plane including said sheet spring, whereby said magnet-yoke assembly is returned to its neutral position after infinitesimal rotation.

8. A rotary information recording/reproducing apparatus according to claim 7, wherein the yoke and the permanent magnet of said magnet-yoke assembly are so structured as to be detachable from said apparatus in a condition that said yoke and said permanent magnet are assembled into an integral unit.

9. A rotary-information recording/reproducing apparatus according to claim 6, wherein the yoke and the permanent magnet of said magnet-yoke assembly are so structured as to be detachable from said apparatus in a condition that said yoke and said permanent magnet are assembled into an integral unit.

10. A rotary information recording/reproducing apparatus according to claim 6, wherein the yoke of said magnet-yoke assembly includes an outer peripheral portion and an inner portion lying inwardly of said outer peripheral portion, a radial thickness of said outer peripheral portion being greater than an axial thickness of said inner portion.

11. A rotary information recording/reproducing apparatus according to claim 6, wherein the yoke of said magnet-yoke assembly has a generally semicircular shape provided with a central opening for said carriage and with a cutout formed in continuity with said opening and having diverging edges extending substantially parallel to an outer peripheral edge of said disk, a central angle formed between the diverging edges of said cutout being smaller than 180 degrees.

12. A rotary information recording/reproducing apparatus according to claim 1, wherein said magnet-yoke assembly supporting means includes a sliding bearing, a assembly-supporting member and a reaction-force damping member, said sliding bearing comprising a groove formed in the outer peripheral surface of said magnet-yoke assembly and a projection formed on an inner peripheral surface of said assembly-supporting member and slidably engaged in said groove, said assembly-supporting member being fixed to said base to support said magnet-yoke assembly so as to be independent of said base and infinitesimally rotatable, said reaction-force damping member being a plate-shaped member mounted between the outer peripheral surface of said magnet-yoke assembly and the inner peripheral surface of said assembly-supporting member.

13. A rotary information recording/reproducing apparatus according to claim 12, wherein at least one sheet spring is mounted between the outer peripheral surface of said magnet-yoke assembly and said assembly-supporting member, said sheet spring being fixed to said magnet-yoke assembly and said assembly-supporting member such that said sheet spring extends substantially perpendicularly to said base and the center of said carriage pivot shaft is positioned in a plane including said sheet spring, whereby said magnet-yoke assembly is returned to its neutral position after infinitesimal rotation.

14. A rotary information recording/reproducing apparatus according to claim 12, wherein the yoke and the permanent magnet of said magnet-yoke assembly are so structured as to be detachable from said apparatus in a condition that said yoke and said permanent magnet are assembled into an integral unit.

15. A rotary information recording/reproducing apparatus according to claim 12, wherein the yoke of said magnet-yoke assembly includes an outer peripheral portion and an inner portion lying inwardly of said outer peripheral portion, a radial thickness of said outer peripheral portion being greater than an axial thickness of said inner portion.

16. A rotary information recording/reproducing apparatus according to claim 12, wherein the yoke of said magnet-yoke assembly has a generally semicircular shape provided with a central opening for said carriage and with a cutout formed in continuity with said opening and having diverging edges extending substantially parallel to an outer peripheral edge of said disk, a central angle formed between the diverging edges of said cutout being smaller than 180 degrees.

17. A rotary information recording/reproducing apparatus according to claim 1, wherein said magnet-yoke assembly supporting means includes a sliding bearing, assembly-supporting member and a reaction-force damping member, said sliding bearing comprising a projection formed on the outer peripheral surface of said magnet-yoke assembly and a groove formed in an inner peripheral surface of said assembly-supporting member and slidably engaged with said projection, said assembly-supporting member being fixed to said base for supporting said magnet-yoke assembly so as to be independent of said base and infinitesimally rotatable, said reaction-force damping member being a plate-shaped member mounted between the outer peripheral surface of said magnet-yoke assembly and the inner peripheral surface of said assembly-supporting member.

18. A rotary information recording/reproducing apparatus according to claim 17, wherein at least one sheet spring is mounted between the outer peripheral surface of said magnet-yoke assembly and said assembly-supporting member, said sheet spring being fixed to said magnet-yoke assembly and said assembly-supporting member such that said sheet spring extends substantially perpendicularly to said base and the center of said carriage pivot shaft is positioned in a plane including said sheet spring, whereby said magnet-yoke assembly is returned to its neutral position after infinitesimal rotation.

19. A rotary information recording/reproducing apparatus according to claim 17, wherein the yoke and the permanent magnet of said magnet-yoke assembly are so structured as to be detachable from said apparatus in a condition that said yoke and said permanent magnet are assembled into an integral unit.

20. A rotary information recording/reproducing apparatus according to claim 17, wherein the yoke of said magnet-yoke assembly includes an outer peripheral portion and an inner portion lying inwardly of said outer peripheral portion, a radial thickness of said outer peripheral portion being greater than an axial thickness of said inner portion.

21. A rotary information recording/reproducing apparatus according to claim 17, wherein the yoke of said magnet-yoke assembly has a generally semicircular shape provided with a central opening for said carriage and with a cutout formed in continuity with said opening and having diverging edges extending substantially parallel to an outer peripheral edge of said disk, a central angle formed between the diverging edges of said cutout being smaller than 180 degrees.

22. A rotary information recording/reproducing apparatus according to claim 1, wherein said magnet-yoke assembly supporting means includes a dashpot mechanism provided on the outer peripheral surface of said magnet-yoke assembly and an assembly-supporting member for supporting said dashpot mechanism, said dashpot mechanism comprising an arcuate shaft, at least one piston having a plurality of through holes parallel to said arcuate shaft and fixed thereto, and an arcuate housing having formed therein a cavity to slidably receive said piston, both ends of said arcuate shaft projecting outwardly of said cavity through respective openings formed in two covers for covering both open ends of said cavity, said arcuate housing being fixed to the outer peripheral surface of said magnet-yoke assembly, both ends of said arcuate shaft being supported by said assembly-supporting member, said assembly-supporting member being fixed to said base for supporting said magnet-yoke assembly so as to be independent of said base and infinitesimally rotatable via said dashpot mechanism.

23. A rotary information recording/reproducing apparatus according to claim 22, wherein the yoke of said magnet-yoke assembly includes an outer peripheral portion and an inner portion lying inwardly of said outer peripheral portion, a radial thickness of said outer peripheral portion being greater than an axial thickness of said inner portion.

24. A rotary information recording/reproducing apparatus according to claim 22, wherein the yoke of said magnet-yoke assembly has a generally semicircular shape provided with a central opening for said carriage and with a cutout formed in continuity with said opening and having diverging edges extending substantially parallel to an outer peripheral edge of said disk, a central angle formed between the diverging edges of said cutout being smaller than 180 degrees.

25. A rotary information recording/reproducing apparatus according to claim 22, wherein at least one sheet spring is mounted between the outer peripheral surface of said magnet-yoke assembly and said assembly-supporting member, said sheet spring being fixed to said magnet-yoke assembly and said assembly-supporting member such that said sheet spring extends substantially perpendicularly to said base and the center of said carriage pivot shaft is positioned in a plane including said sheet spring, whereby said magnet-yoke assembly is returned to its neutral position after infinitesimal rotation.

26. A rotary information recording/reproducing apparatus according to claim 22, wherein the yoke and the permanent magnet of said magnet-yoke assembly are so structured as to be detachable from said apparatus in a condition that said yoke and said permanent magnet are assembled into an integral unit.

27. A rotary information recording/reproducing apparatus according to claim 1, wherein said magnet-yoke assembly supporting means includes a dashpot mechanism provided on the outer peripheral surface of said magnet-yoke assembly and an assembly-supporting member for supporting said dashpot mechanism, said dashpot mechanism comprising an arcuate shaft, at least one piston having a plurality of through holes parallel to said arcuate shaft and fixed thereto, and an arcuate housing having formed therein a cavity to slidably receive said piston, both ends of said arcuate shaft projecting outwardly of said cavity through respective openings formed in two covers for covering both open ends of said cavity, said arcuate housing being fixed to said assembly-supporting member, both ends of said arcuate shaft being supported by said magnet-yoke assembly, said assembly-supporting member being fixed to said base for supporting said magnet-yoke assembly so as to be independent of said base and infinitesimally rotatable via said dashpot mechanism.

28. A rotary information recording/reproducing apparatus according to claim 27, wherein the yoke of said magnet-yoke assembly includes an outer peripheral portion and an inner portion lying inwardly of said outer peripheral portion, a radial thickness of said outer peripheral portion being greater than an axial thickness of said inner portion.

29. A rotary information recording/reproducing apparatus according to claim 27, wherein the yoke of said magnet-yoke assembly has a generally semicircular shape provided with a central opening for said carriage and with a cutout formed in continuity with said opening and having diverging edges extending substantially parallel to an outer peripheral edge of said disk, a central angle formed between the diverging edges of said cutout being smaller than 180 degrees.

30. A rotary information recording/reproducing apparatus according to claim 27, wherein at least one sheet spring is mounted between the outer peripheral surface of said magnet-yoke assembly and said assembly-supporting member, said sheet spring being fixed to said magnet-yoke assembly and said assembly-supporting member such that said sheet spring extends substantially perpendicularly to said base and the center of said carriage pivot shaft is positioned in a plane including said sheet spring, whereby said magnet-yoke assembly is returned to its neutral position infinitesimal rotation.

31. A rotary information recording/reproducing apparatus according to claim 27, wherein the yoke and the permanent magnet of said magnet-yoke assembly are so structured as to be detachable from said apparatus in a condition that said yoke and said permanent magnet are assembled into an integral unit.

32. A rotary information recording/reproducing apparatus according to claim 1, wherein the yoke of said magnet-yoke assembly includes an outer peripheral portion and an inner portion lying inwardly of said outer peripheral portion, a radial thickness of said outer peripheral portion being greater than an axial thickness of said inner portion.

33. A rotary information recording/reproducing apparatus according to claim 32, wherein at least one sheet spring is mounted between the outer peripheral surface of said magnet-yoke assembly and said assembly-supporting member, said sheet spring being fixed to said magnet-yoke assembly and said assembly-supporting member such that said sheet spring extends substantially perpendicularly to said base and the center of said carriage pivot shaft is positioned in a plane including said sheet spring, whereby said magnet-yoke assembly is 34. A rotary information recording/reproducing apparatus according to claim 32, wherein at least one sheet spring is mounted between the outer peripheral surface of said magnet-yoke assembly and said assembly-supporting member, said sheet spring being fixed to said magnet-yoke assembly and said assembly-supporting member such that said sheet spring extends substantially perpendicularly to said base and the center of said carriage pivot shaft is positioned in a plane including said sheet spring, whereby said magnet-yoke assembly is returned to its neutral position after infinitesimal rotation.

35. A rotary information recording/reproducing apparatus according to claim 32, wherein the yoke and the permanent magnet of said magnet-yoke assembly are so structured as to be detachable from said apparatus in a condition that said yoke and said permanent magnet are assembled into an integral unit.

36. A rotary information recording/reproducing apparatus according to claim 1, wherein the yoke of said magnet-yoke assembly has a generally semicircular shape provided with a central opening for said carriage and with a cutout formed in continuity with said opening and having diverging edges extending substantially parallel to an outer peripheral edge of said disk, a central angle formed between the diverging edges of said cutout being smaller than 180 degrees.

37. A rotary information recording/reproducing apparatus according to claim 36, wherein at least one sheet spring is mounted between the outer peripheral surface of said magnet-yoke assembly and said assembly-supporting member, said sheet spring being fixed to said magnet-yoke assembly and said assembly-supporting member such that said sheet spring extends substantially perpendicularly to said base and the center of said carriage pivot shaft is positioned in a plane including said sheet spring, whereby said magnet-yoke assembly is returned to its neutral position after infinitesimal rotation.

38. A rotary information recording/reproducing apparatus according to claim 36, wherein the yoke and the permanent magnet of said magnet-yoke assembly are so structured as to be detachable from said apparatus in a condition that said yoke and said permanent magnet are assembled into an integral unit.

39. A rotary information recording/reproducing apparatus according to claim 1, wherein the yoke and the permanent magnet of said magnet-yoke assembly are so structured as to be detachable from said apparatus in a condition that said yoke and said permanent magnet are assembled into an integral unit.

* * * * *

UNITED STATES PATENT AND TRADEMARK OFFICE
CERTIFICATE OF CORRECTION

PATENT NO. : 5,486,965
DATED : Jan. 23, 1996
INVENTOR(S) : YOSHIDA, et al

It is certified that error appears in the above-identified patent and that said Letters Patent is hereby corrected as shown below:

IN THE CLAIMS:
Column 14,
Claim 7, line 1, after "apparatus" insert

--according to claim 6, wherein at least one sheet--.

Signed and Sealed this

Twenty-fifth Day of June, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.   : 5,486,965
DATED        : Jan. 23, 1996
INVENTOR(S)  : Yoshida et al It is certified that error appears in the above-indentified patent and that said Letters Patent is hereby corrected as shown below:

Please correct the following claims:

Claim 6, line 3, delete "a" (second occurrence)
     and insert --an--.
  Claim 12, line 3, delete "a" (second occurrence)
     and insert --an--.
  Claim 17, line 3, after "bearing," insert --an--.
  Claim 30, line 10, after "position" insert --after--.

Please replace patent claim 33 with the following
  corrected claim 33:

--33. A rotary information recording/reproducing apparatus according to Claim 32, wherein the yoke of said magnet-yoke assembly has a generally semicircular shape provided with a central opening for said carriage and with a cutout formed in continuity with said opening and having diverging edges extending substantially parallel to an outer peripheral edge of said disk, a central angle formed between the diverging edges of said cutout being smaller than 180 degrees.--

Signed and Sealed this

Ninth Day of September, 1997

BRUCE LEHMAN

*Attest:*

*Attesting Officer*          *Commissioner of Patents and Trademarks*